United States Patent
Amstutz et al.

[11] Patent Number: 6,055,965
[45] Date of Patent: May 2, 2000

[54] CONTROL SYSTEM FOR EXHAUST GAS RECIRCULATION SYSTEM IN AN INTERNAL COMBUSTION ENGINE

[75] Inventors: Alois Amstutz, Knonau, Switzerland; James J. Faletti, Spring Valley, Ill.

[73] Assignee: Caterpillar Inc., Peoria, Ill.

[21] Appl. No.: 08/889,611

[22] Filed: Jul. 8, 1997

[51] Int. Cl.[7] .......................... F02B 33/42; F02M 25/07
[52] U.S. Cl. ........................ 123/559.2; 60/605.2
[58] Field of Search .................... 60/600, 601, 605.2; 123/559.2

[56] References Cited

U.S. PATENT DOCUMENTS

| | | |
|---|---|---|
| 3,874,166 | 4/1975 | Kirchhofer et al. . |
| 4,232,999 | 11/1980 | Croes et al. ........................ 417/64 |
| 4,474,008 | 10/1984 | Sakurai et al. .................... 60/605.2 |
| 4,488,532 | 12/1984 | Mayer . |
| 4,561,407 | 12/1985 | Jaussi et al. . |
| 4,592,330 | 6/1986 | Mayer . |
| 4,662,342 | 5/1987 | Altmann et al. . |
| 4,798,049 | 1/1989 | Mayer ............................... 123/559.2 |
| 5,052,362 | 10/1991 | Jenny et al. ....................... 123/559.2 |
| 5,133,228 | 7/1992 | Takata et al. ........................ 60/600 |
| 5,261,236 | 11/1993 | Ironside et al. ..................... 60/600 |
| 5,771,867 | 6/1998 | Amstutz et al. .................. 123/559.2 |
| 5,839,416 | 11/1998 | Kruiswyk et al. ................ 123/559.2 |

FOREIGN PATENT DOCUMENTS

| | | |
|---|---|---|
| 28 22 207 | 11/1979 | Germany . |
| 668292 | 12/1998 | Switzerland .................... 123/559.2 |
| 775278 | 5/1957 | United Kingdom . |

*Primary Examiner*—Michael Koczo
*Attorney, Agent, or Firm*—Robert J. Hampsch

[57] ABSTRACT

A closed loop control system for an exhaust gas recovery flow in an internal combustion engine having an intake air pressurizing device is provided. The closed loop control system includes an engine controller connected to an intake air mass flow sensor, an engine operation sensor, and an intake air throttle valve for controlling the intake air mass flow rate. In addition, the controller is operatively connected to a variable gas pocket valve for selectively controlling exhaust gas feedback in conjunction with the intake air throttle valve. The variable gas pocket valve and the intake air throttle valve may be actuated in response to the control system parameters to provide accurate control of exhaust gas recovery flow to provide reduced emissions of unburned fuel and particulate matter from the engine.

11 Claims, 2 Drawing Sheets

CONTROL SYSTEM FOR EXHAUST GAS RECIRCULATION SYSTEM IN AN INTERNAL COMBUSTION ENGINE

TECHNICAL FIELD

The present invention relates to emission control system for an internal combustion engine, and more particularly, to exhaust gas recovery control system and apparatus for internal combustion engines which will minimize NOx and other emissions while minimizing particulate matter emissions from internal combustion engines.

BACKGROUND ART

Exhaust gas re-circulation is a technique commonly used for controlling the generation of undesirable pollutant gases and particulate matter in the operation of internal combustion engines. This technique has proven particularly useful in internal combustion engines used in motor vehicles such as passenger cars, light duty trucks, and other on-road motor equipment. The exhaust gas re-circulation technique primarily involves the re-circulation of exhaust gas by-products into the intake air supply of the internal combustion engine. This exhaust gas thus reintroduced to the engine cylinder reduces the concentration of oxygen therein, which in turn lowers the maximum combustion temperature within the cylinder and slows the chemical reaction of the combustion process, decreasing the formation of nitrous oxide. Furthermore, the exhaust gases typically contain a portion of unburned hydrocarbon which is burned on its reintroduction into the engine cylinder, which further reduces the emission of exhaust gas by-products which would be emitted as undesirable pollutants from the internal combustion engine.

However, it is necessary to carefully control the proportion of re-circulated exhaust gas to intake air. For example, while a greater proportion of exhaust gas may be re-circulated at low load levels, it is necessary to ensure that the proportion of re-circulated exhaust gas does not become excessive, causing the engine to stop due to a lack of sufficient oxygen to mix with the fuel so as to permit combustion. On the other hand, if the proportion of exhaust gas re-circulated at full engine load is excessive, the power output of the internal combustion engine is reduced, and the engine will typically emit undesirable quantities of smoke and particulate matter due to unsatisfactory combustion in the engine cylinders. Therefore, it is clear that the exhaust gas re-circulation process is desirably tightly controlled.

Another technique useful in the control and reduction of undesirable emissions from internal combustion engines is the use of pressure-charged intake air. This permits the use of relatively smaller cubic displacement and lighter weight internal combustion engines in mobile equipment, reducing in turn the specific fuel consumption of the vehicle and overall mass of the vehicle necessary to perform a given function. In addition to the benefits of reduced size and mass, the typical pressure-charging device may be controlled to provide improved emissions characteristics. Pressure-charging machines suitable for such applications include the exhaust gas driven turbocharger which is comprised typically of an exhaust gas driven turbine linked to a compressor disposed in the intake air stream to provide compression of the intake air. One way of controlling a turbocharger is to provide a gate which controls exhaust gas flow and gates exhaust gas to bypass the exhaust gas turbine and control the charging rate of the turbocharger so that the maximum pressure limits of the associated internal combustion engine are not exceeded. Another device particularly suited for such pressure-charged internal combustion engines is the gas-dynamic pressure-wave supercharger. This pressure-wave supercharger is particularly well suited for use in diesel-type internal combustion engines for such applications, due to the fact that this type of supercharger provides a rapid response to changing load requirements and provides a high charging rate in the lower and middle ranges of operating speeds. Furthermore, since the exhaust gas and the intake air are in direct contact in such a machine, there is a degree of mixing therebetween which desirably varies according to the load placed on the internal combustion engine apparatus. For example, at full load the supercharger is typically over-scavenged to the point where a greater amount of air is compressed and is available to the engine than is required, permitting a complete scavenging of the exhaust gas from the supercharger. However, at less than full load and as the load decreases, the amount of available intake air likewise decreases so that at low and partial loads the supercharger is under-scavenged and permits a portion of the exhaust gas to be fed to the internal combustion engine along with the intake air. This characteristic is generally desirable and works in conjunction with the emission controls of the internal combustion engines. It is typically insufficient to provide an adequate control of emissions as the legal standards and emissions standards are progressively tightened to permit reduced vehicle emissions. Furthermore, the uncontrolled re-circulation of exhaust gas into the compressed intake air via the supercharger can adversely affect the operation of the internal combustion engine at low speed and low load conditions such as idling.

One means of controlling the scavenging of exhaust gas by-products from the supercharger is the provision of a gas pocket in the gas casing between the high pressure exhaust gas duct and the low pressure exhaust gas duct. This is typically done in conjunction with an expansion pocket provided in the air side casing of the supercharger to improve control of the low pressure scavenging of the expanded exhaust gas from the supercharger rotor. It is of course possible to provide and uncontrolled flow of exhaust gas to the gas pocket. As the static pressure in the gas pocket is the same as the pressure in the exhaust gas duct, this is called a static gas pocket feed. A variable gas pocket is another and better method of providing exhaust gas to the gas pocket by way of a passage from the exhaust gas duct wherein a valve is provided in the passage to provide a controllable flow of the exhaust gas to the gas pocket.

One method of controlling the operation of the valve in such a variable gas pocket apparatus is by way of a temperature-responsive bimetal flap. The flap operates in response to increasing exhaust gas temperature to progressively close and decrease the flow of exhaust gas into the gas pocket. Therefore, as the load on the internal combustion engine increases and the exhaust temperature rises, the amount of exhaust gas provided to the gas pocket is progressively reduced, and the amount of exhaust gas energy available for operating the supercharger rotor is progressively increased. Since the supercharger in this situation is progressively tending toward the high load, over-scavenged condition, the scavenging effect of the gas pocket is neither required nor desired.

It is also known to provide a valve for the gas pocket which is operated by an actuator responsive to a controller for operating the motor to provide valve positions at various engine operating and load parameters as selected according to pre-determined characteristic curves. As the legal emission standards have become more stringent, however, it has become increasingly desirable to integrate the control functions of the engine with the emission control system to ensure smooth operation of the engine while providing the minimum emissions therefrom. One of the primary disadvantages in obtaining this goal in the related art has been the inability to integrate the control of multiple engine functions, for example, the rate of fuel injection into a diesel-type engine, control of the intake throttle valve for dividing the nominal air flow in the intake air ducting to the supercharger, providing desirable control of the variable gas pocket, and providing a simultaneous integrated control of such functions while providing a closed-type control loop to ensure the best possible engine and emissions performance. The present invention overcomes some of these related art disadvantages.

SUMMARY OF THE INVENTION

The present invention is an improved emission control system providing simultaneous control of the exhaust gas re-circulation system in conjunction with a closed-loop type control of the variable gas pocket valve and the intake throttle valve on a supercharger-type pressure-charged internal combustion engine, or, in a turbocharger equipped pressure-charged internal combustion engine, simultaneous control of the exhaust gas re-circulation system in conjunction with the intake throttling valve or back-pressure control valve.

Accordingly, one aspect of the present invention is to provide an improved emission control system for internal combustion engines which will provide the closed-type control loop for the variable gas pocket valve and the intake throttle valve.

Another aspect of the present invention is to provide such an improved emission control system as will have a more accurate control of the exhaust gas re-circulation.

A further aspect of the present invention is to provide such an improved emission control system as will minimize specific fuel consumption while concurrently minimizing emissions such as nitrous oxide and minimizing the release of undesirable particulate matter.

These and other features and advantages of the present invention will become apparent to those skilled in the art upon a reading of the following detailed description when taken in conjunction with the drawings wherein there is shown and described an illustrative embodiment of the invention.

DESCRIPTION OF THE PREFERRED EMBODIMENT

The following description is of the best mode presently contemplated for carrying out the invention. This description is not to be taken in a limiting sense, but is made merely for the purpose of describing the general principals of the invention. The scope and breadth of the invention should be determined with reference to the claims.

Figure 1:
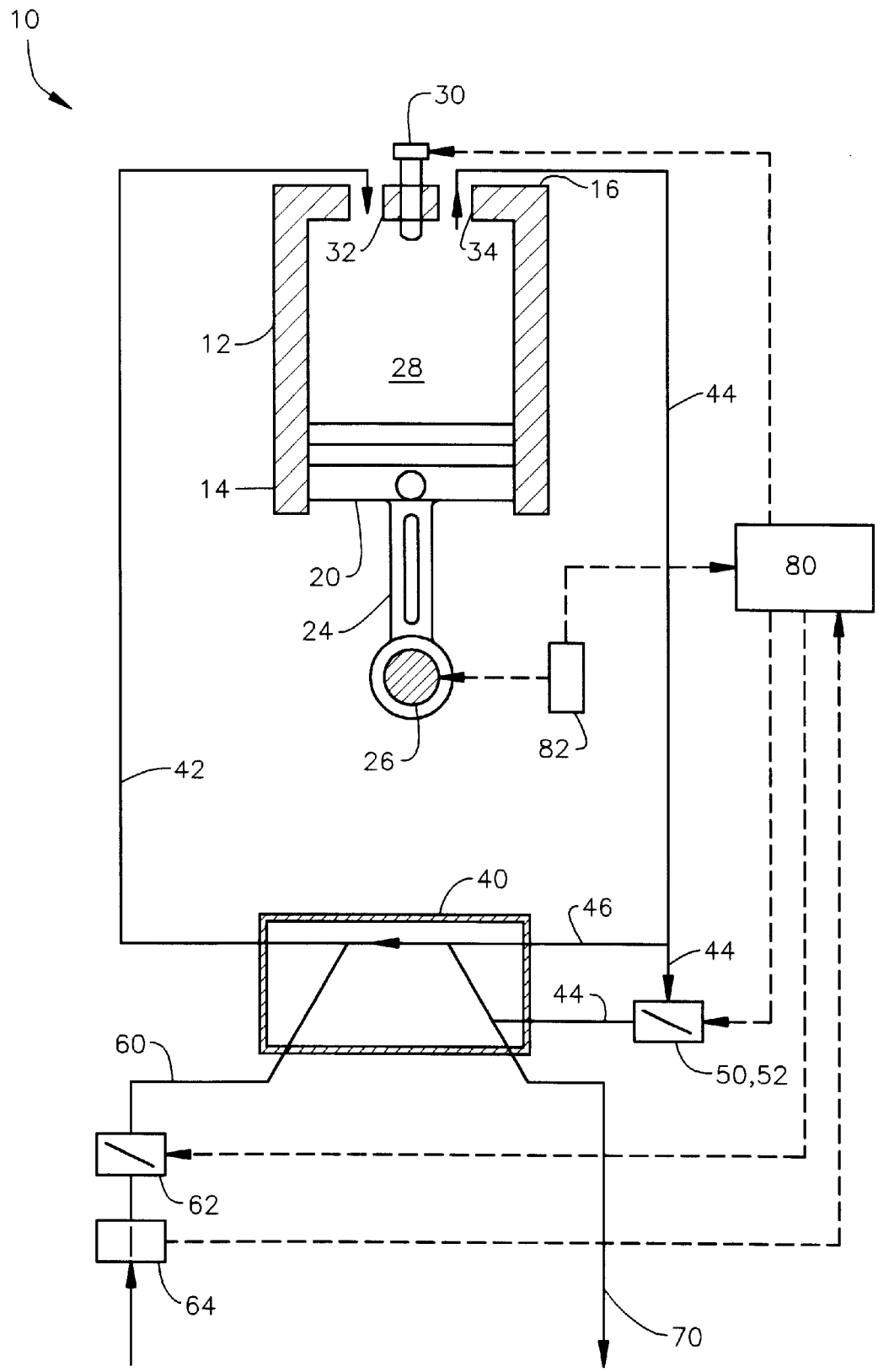
FIG. 1 discloses schematically an exhaust gas recovery feedback system according to the present invention as employed in a representative reciprocating-piston type internal combustion engine.

Referring now to the drawings, and particularly FIG. 1, there is shown a schematic representation of a single-cylinder reciprocating-piston type internal combustion engine incorporating the present invention and referred to generally by reference number 10.

The exemplary engine 10 includes an engine block 12 having a cylindrical cylinder wall 14 and a cylinder head 16 acting as a closure on one end thereof. A cylindrical piston 20 disposed within the cylinder wall 14 of the engine block 12 operates reciprocally within the cylinder wall 14. The piston 20, the cylinder wall 14, and the cylinder head 16 cooperate to define a combustion chamber of varying volume within the engine 10 for the burning of a fuel-air mixture therein.

The piston 20 is connected by piston connecting rod 24 to a crankshaft 26. The crankshaft includes offset crankshaft portion for translating the linear reciprocating motion of the piston 20 into rotary motion to provide a power means for obtaining power output from the engine 10, and further for translating rotary motion of the crankshaft 26 into reciprocating motion of the piston 20 during those portions of the engine cycle when the piston 20 is not power producing.

A fuel injector 30 extends through an aperture in the cylinder head 16 for providing a controlled, intermittent spray of atomized fuel into the combustion chamber for mixing with intake air during a compression stroke of the piston 20. A controlled intermittent flow of pressurized intake air into the combustion chamber is permitted through a typically valved intake aperture 32, and a controlled intermittent flow of exhaust gases and combustion byproducts is permitted through a typically valved exhaust aperture 34.

Those skilled in the art will recognize that additional components are typically included in such an engine 10 as is exemplified herein. Other apparatus associated with such an engine 10 includes intake valves, exhaust valves, mechanism for operating such valves, mechanism for lubricating and tooling the engine 10, and other apparatus. It is believed that those skilled in the art are well acquainted with such apparatus and will be readily able to select such apparatus as is necessary to the satisfactory construction and operation of an engine 10. No particular form of type of such associated apparatus is necessary to the operation of the engine 10 other than that which is commonly employed in the art, and therefore such apparatus is not further discussed herein. Furthermore, of course, the subject invention is to be understood as applicable with equal suitability to multiple cylinder engines. Therefore, the engine 10 as set forth herein should be considered as exemplary and not limiting.

The engine 10 includes an intake air flow path 42, which is typically an intake air manifold (not shown), for transporting intake air to the intake aperture 32, and an exhaust gas flow path 46 for transporting exhaust gases from the exhaust gas aperture 34. The exhaust gases are transported to an intake air pressurizing device 40. The intake air pressurizing device 40 is operated by the relatively high pressure of the exhaust gases and under the influence thereof, operably compresses intake air received at ambient pressure. The intake air pressurizing device 40 is in flow connection with the intake air flow path 42 and directs the pressurized intake air therethrough for supplying pressurized intake air to the intake aperture 32.

The intake air pressurizing device 40 further is operatively associated with an exhaust gas bypass 44 and a bypass valve, preferably a variable gas pocket valve 50. The exhaust gas bypass 44 is in flow communication with the exhaust gas flow path 46 for receiving a portion of the exhaust gas flow therethrough and selectively controlling a flow of exhaust gas through the exhaust gas bypass 44 in a volumetric flow as controlled by the variable gas pocket valve 50. The exhaust gas bypass 44 and variable gas pocket valve 50 direct a portion of exhaust gas into the intake air pressurizing device 40 and out to the exhaust gas discharge path 70. The remaining volume of exhaust gas flows drives the intake air pressurizing device 40 where the portion of the remaining volume of the exhaust gas is mixed with the incoming air for recirculation through the engine 10.

The engine 10 is further provided with an ambient air intake path 60 for permitting a flow of ambient air into the intake air pressurizing device 40. An intake air throttle valve 62 is disposed in the ambient air intake path 60 for controlling the volumetric flow of air through the ambient air intake path 60 and thus the mixing of exhaust gas with intake air. In the illustrated embodiment, the engine also includes an intake air mass flow sensor 64 disposed in the ambient air intake path 60 for measuring the air mass flow rate through the ambient air intake path 60. The engine 10 is also provided with an exhaust gas discharge path 70 for permitting the escape of the remaining exhaust gas from the intake air pressurizing device 40.

An engine controller 80 is provided on the engine 10. The engine controller 80, as is known to those skilled in the art, will typically contain means for controlling the operation of the engine 10 in response to sensed measurements of various operating parameters of the engine 10 as provided to the controller 80 by various sensors disposed on and in conjunction with the engine 10. As it relates to the present invention, the controller 80 is provided with a means for sensing the operating speed and load of the engine by way of the crankshaft 26, typically an engine operation sensor 82 for indicating the instant rotational speed in terms of revolutions per minute of the engine crankshaft 26, such as is known to those skilled in the art. The engine controller 80 is also adapted for controlling the fuel injector 30 to control the quantity, timing, and duration of fuel injected into the combustion chamber of the engine 10. The controller 80 is also connected to the intake air mass flow sensor 64 for receiving a measurement of intake air mass flow. Finally, the controller 80 is connected to the variable gas pocket valve 50 and to the intake air throttle valve 62 for selectively controlling the variable gas pocket valve 50 and the intake air throttle valve 62 so as to control the intake air mass flow in response to the sensed mass flow rate and the sensed crankshaft rotation rate, and to control the mass flow rate of the exhaust gas recirculated through the exhaust gas bypass 44 by selective actuation of the variable gas pocket valve 50.

The engine controller 80 is a means for providing closed loop control of an exhaust gas recovery feedback system of the engine 10, providing independent and simultaneous closed loop control of the variable gas pocket valve 50 and the intake throttle valve 62. In its preferred mode of operation, the controller 80 actuates the variable gas pocket valve 50 to its maximum volumetric flow rate condition prior to actuating the intake air throttle valve 62 thereby maximizing recirculation of exhaust gas to the combustion chamber and minimizing fuel consumption. As the load demand on the engine 10 increases, the controller 80 continuously actuates the variable gas pocket valve 50 and the intake air throttle valve 62 to cause a continuous transition of control from the variable gas pocket valve 50 to the intake air throttle valve 62. This independent, simultaneous control of both the variable gas pocket valve 50 and the air throttle valve 62 permits the controller 80 to function as a closed loop controller on these elements, for permitting a control of the exhaust gas recirculation rate through the exhaust gas bypass 44 in all operating modes of the engine 10.

Figure 2:
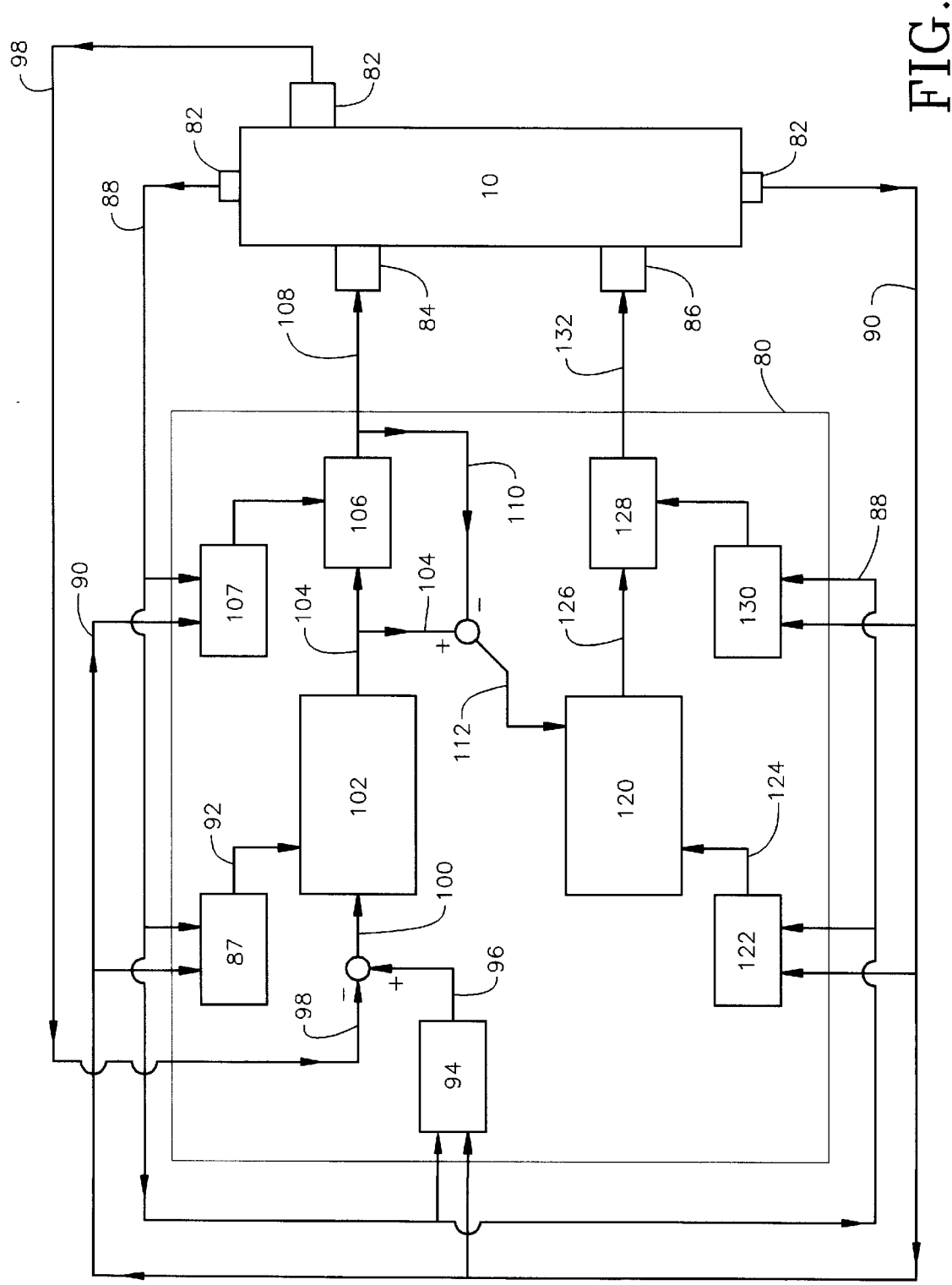
FIG. 2 is a general block diagram of a control system to provide the closed-type control loop for the variable gas pocket valve and the intake throttle valve in accordance with the principles of the present invention.

Referring now to FIG. 2, there is shown a functional block diagram of the preferred closed loop control system, generally designated by the numeral 81. As illustrated, the closed loop control system 81 is operatively coupled to a pair of actuators 84, 86 for controlling the operation selected mechanisms such as air flow valves associated with the engine 10. In the illustrated embodiment, the actuators 84, 86 are operatively coupled to a variable gas pocket valve 50 and an air intake throttle valve 62 of the engine, respectively. It should be noted however, that the present closed loop control system 81 is equally adaptable for use with other actuators and associated mechanisms including, but not limited to, exhaust gas recirculation valves and actuators, back pressure valves and actuators, and variable gas turbine actuators. The disclosed closed loop control system 81 also incorporates a feedback loop wherein one of the actuator control signal outputs is used as an input to the control of the other actuator. The closed loop control system 81 also utilizes one or more measured engine operating parameters as input signals. In the present embodiment, the closed loop control system 81 utilizes measured parameters such as the measured air mass flow through the engine, engine speed, and fuel mass. Similar such engine operating parameters such as engine operating temperatures, coolant temperatures, air intake temperatures, throttle position, and the like, can also be used.

In the illustrated embodiment, the closed loop control system 81 operates by determining a variable gas pocket valve target position 87 based on selected engine operating parameters such as the measured engine speed 88 and the desired fuel mass 90. The variable gas pocket valve target position 87 or feed forward VGP actuator angle is then converted to a VGP actuator voltage signal 92. Concurrently, the desired air mass flow 94 is calculated using the measured engine speed 88 and the fuel mass 90 as inputs. The desired air mass flow value 94, expressed in terms of lambda or the reciprocal of the equivalence ratio, is then converted to a desired air mass flow voltage signal 96 which is then compared to the measured air flow mass signal 98 to yield an air mass flow variance signal 100.

The air flow mass variance signal 100 together with the VGP actuator voltage signal 92 are forwarded to the VGP controller 102 for determining the commanded VGP actuator signal 104. The commanded VGP actuator signal 104 is forwarded to a VGP limiter 106 which adjusts, if necessary, the commanded VGP actuator signal 104 to fall within prescribed angle limits 107. The prescribed angle limits 107 are preferably determined using various engine operating parameters such as engine speed 88 and fuel mass 90 parameters. The adjusted or corrected VGP actuator signal 108 is then forwarded to the VGP actuator 84 thus commanding the VGP valve 50 to the appropriate position.

A feedback signal 110, representing the corrected VGP actuator signal, is then compared to the commanded VGP actuator signal 104 to yield a VGP actuator variance signal 112. Any variance between the corrected VGP actuator signal 108 and the commanded VGP actuator signal 104 is embodied in the VGP actuator variance signal 112 which is used as an input to the intake throttle valve controller 120. Concurrently, the closed loop control system 81 is also determining an intake throttle valve target position 122 based on the selected engine operating parameters such as the measured engine speed 88 and the desired fuel mass 90. The intake throttle valve target position 122 or feed forward intake throttle actuator angle is converted to an intake throttle actuator voltage signal 124 which, along with the VGP actuator variance signal 112, are input to the intake throttle valve controller 120 for purposes of determining the commanded intake throttle actuator signal 126. The commanded intake throttle actuator signal 126 is forwarded to an intake throttle limiter 128 which adjusts, as required, the commanded intake throttle actuator signal 126 to within prescribed angle limits 130. As with the VGP limiter, the prescribed angle limits 130 for the intake throttle actuator 86 are preferably determined using various engine operating parameters such as the engine speed 88 and fuel mass 90 parameters. The corrected intake throttle actuator signal 132 is forwarded to the intake throttle actuator 86 thereby commanding the intake throttle valve 62 to the appropriate position.

Having commanded the VGP actuator 84 and intake throttle actuator 86 to the desired positions, within the engine 10, the air flow mass and other engine operating parameters are measured to yield the new inputs for the control system 81. In this manner, the control system 81 operates in a continuous manner.

It can be seen that the subject invention provides a number of advantages including a reduction of fuel consumption for the engine 10 for a given load. An additional advantage is a superior control of the emission of undesirable exhaust gas byproducts from the exhaust gas discharge 70, due to the fact that the variable gas pocket valve 50 is employed as the primary actuator for air flow within the engine 10, with the intake air throttle valve 62 providing a secondary and complementary control of the intake air mass flow rate. This permits the EGR rate to be controlled across the entire operating range of the engine 10.

From the foregoing, it should be appreciated that the present invention thus provides a control system and apparatus for exhaust gas recovery system in an internal combustion engine. While the invention herein disclosed has been described by means of a specific embodiment and process associated therewith, numerous modifications and variations can be made thereto by those skilled in the art without departing from the scope of the invention as set forth in the claims or sacrificing all its material advantages.

What is claimed is:

1. A system for providing closed loop control of an exhaust gas recirculation flow in an internal combustion engine, said engine defining a combustion chamber for burning a fuel-air mixture and further including an intake air pressurizing device and an intake air flow path, said system comprising:
    an exhaust gas path for permitting a flow of exhaust gas from the combustion chamber to the intake air pressurizing device, said exhaust gas path including an exhaust gas bypass for recirculating exhaust gas to said intake air flow path;
    a bypass valve disposed proximate said exhaust gas bypass for selectively controlling the flow of said exhaust gas portion through said exhaust gas bypass to said intake air flow path;
    an intake air throttle valve for selectively controlling said intake air flow rate; and
    an engine controller connected to said bypass valve and to said intake air throttle valve for cooperatively controlling actuation and providing closed loop control of said bypass valve and said intake air throttle valve thereby providing control of exhaust gas recirculation flow.

2. The system for providing closed loop control of an exhaust gas recovery flow in an engine as set forth in claim 1 wherein the engine is further provided with an engine operation sensor for sensing engine operating parameters, said engine operation sensor operatively connected to said engine controller.

3. The system for providing closed loop control of an exhaust gas recovery flow in an engine as set forth in claim 2 wherein said engine operation sensor is in communication with a crankshaft in said engine for sensing an instant rotational speed thereof.

4. The system for providing closed loop control of an exhaust gas recovery flow in an engine as set forth in claim 1 wherein the engine is further provided with an intake air mass flow rate sensor for sensing a mass flow rate of intake air into said engine, said intake air mass flow rate sensor operatively coupled to said controller.

5. The system for providing closed loop control of an exhaust gas recovery flow in an engine as set forth in claim 1 wherein the intake air pressurizing device is a pressure wave supercharger.

6. The system for providing closed loop control of an exhaust gas recovery flow in an engine as set forth in claim 3 wherein said bypass valve is a variable gas pocket valve.

7. An engine comprised of:
    an engine block including a cylinder wall and a cylinder head;
    a piston operably disposed in said engine for cooperating with said cylinder wall and said cylinder head for defining a combustion chamber in said engine;
    a crankshaft operably connected to said piston for operating at an instant rotational speed;
    an intake air flow path for providing intake air to said combustion chamber;
    an exhaust gas flow path for providing exhaust gas from said combustion chamber;
    an intake air pressurizing device in flow connection with said exhaust gas flow path for operably compressing intake air in response to said exhaust gas and providing pressurized intake air to said combustion chamber;
    an exhaust gas bypass disposed in said intake air pressurizing device, said exhaust gas bypass in flow communication with said exhaust gas flow path for controllably bypassing a portion of exhaust gas from said exhaust gas flow path to said intake air flow path;
    a bypass valve disposed in said exhaust gas bypass for selectively controlling the flow of said exhaust gas portion through said exhaust gas bypass;
    an intake air mass flow rate sensor for sensing a mass flow rate of intake air into said engine;
    an intake air throttle valve disposed in said intake air flow path and adapted for selectively controlling said intake air flow rate; and
    a controller connected to said intake air mass flow rate sensor, said controller further connected to said bypass valve and to said intake air throttle valve for controlling actuation of said bypass valve and said intake air throttle valve for providing a closed loop control of said bypass valve and said intake air throttle valve.

8. The engine as set forth in claim 7 further comprising an engine operation sensor operatively connected to said engine controller.

9. The engine as set forth in claim 8 wherein said intake air pressurizing device is a pressure wave supercharger.

10. The engine as set forth in claim 7 wherein said bypass valve is a variable gas pocket valve.

11. The engine as set forth in claim 8 wherein said engine operation sensor is in communication with said crankshaft and adapter for sensing the instant rotational speed thereof.

* * * * *